July 12, 1949.  L. DUFOUR  2,475,825
COUPLING MECHANISM FOR CONNECTING THE REAR END
OF A TRACTOR MOUNTED POWER PLANT TO A TRAILER
Filed April 18, 1944  2 Sheets-Sheet 1
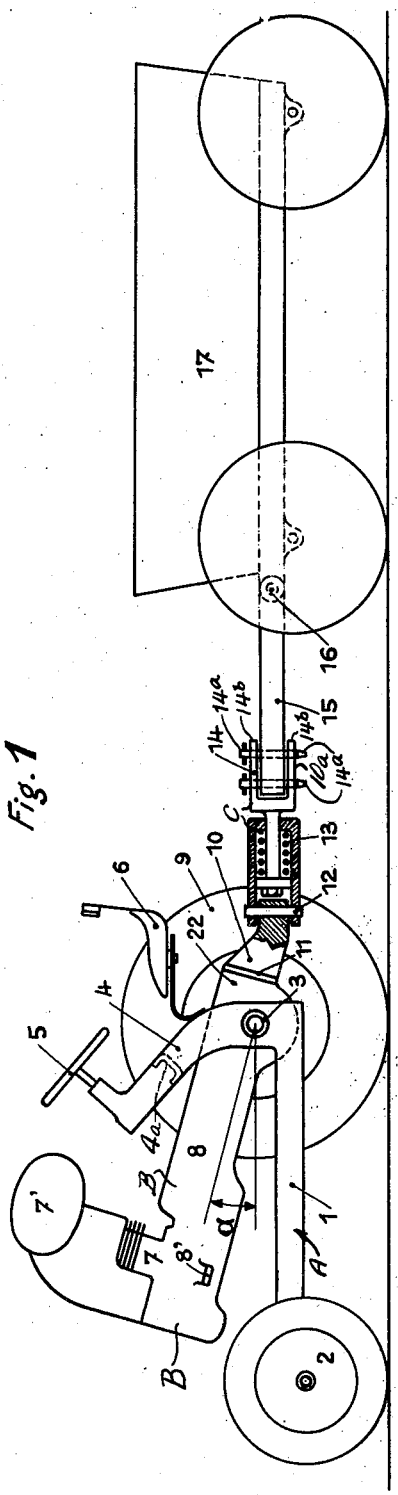
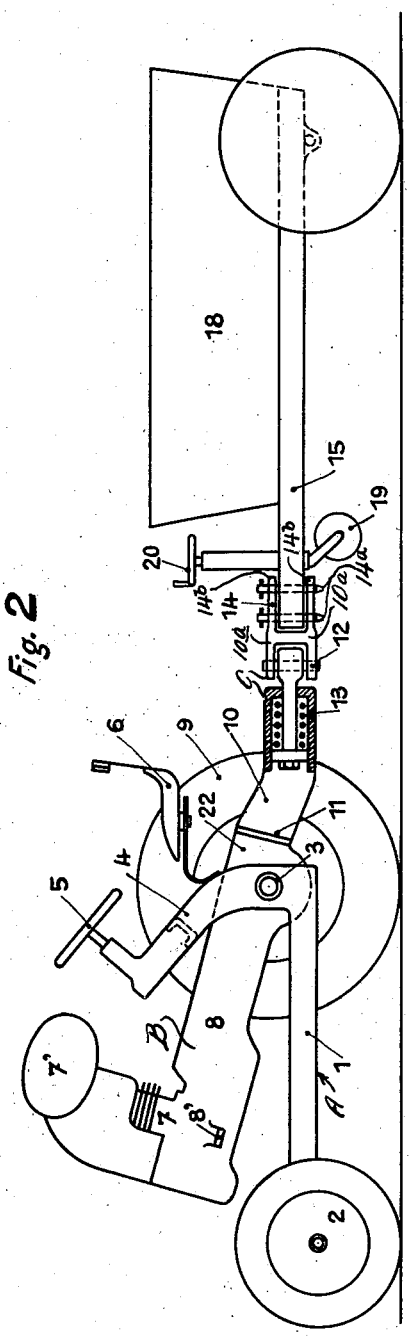
INVENTOR
LEON DUFOUR,
BY *William Kurtzoff*
ATTORNEYS

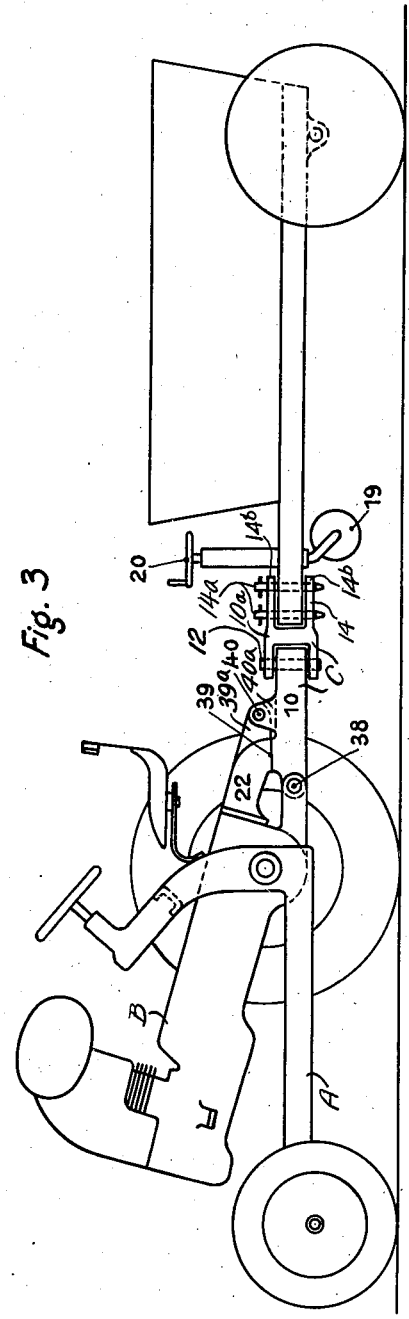
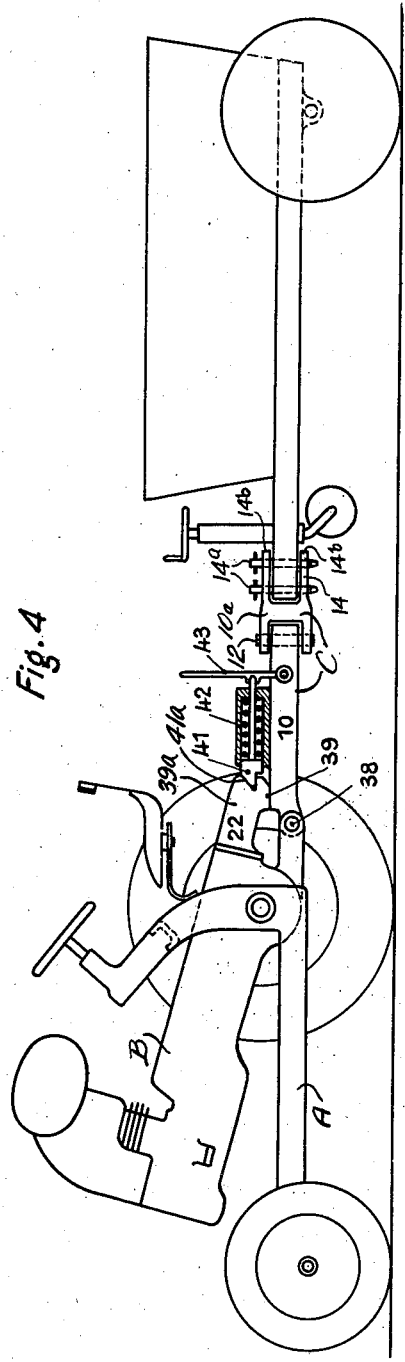

Patented July 12, 1949

2,475,825

UNITED STATES PATENT OFFICE 2,475,825

COUPLING MECHANISM FOR CONNECTING THE REAR END OF A TRACTOR MOUNTED POWER PLANT TO A TRAILER

Leon Dufour, Acacias-Geneva, Switzerland

Application April 18, 1944, Serial No. 531,636
In Switzerland May 10, 1943

6 Claims. (Cl. 180—11)

This invention relates to tractors for agricultural and roadwork purposes consisting of a duplex chassis wherein the part of the chassis which carries the power plant assembly is pivotally supported at or near its rear and co-axially with the driving axle of the vehicle to be maintained in an upwardly tilted position when the tractor is in draft relation to the trailer vehicle or implement due to the fact that a coupling connection, rigid against movement in a vertical plane, is provided between the tractor and the shaft of the drawn vehicle, thereby not only to shift the major portion of the weight of the tractor to the driving wheels, but also to impose a substantial part of the load of the trailer vehicle on said rear wheels to further increase the tractive grip thereof. Thus the present invention provides, for the first time, a novel coupling means which insures both the weight of the power plant assembly and a substantial part of the weight of the trailer being imposed on the rear axle of the tractor.

One of the objects of the invention is to provide improvements on the tractor coupling shown in my former Patent No. 2,035,150, dated March 26, 1936, wherein the complete coupling device is not rigid against vertical movement so that the towload cannot exert any influence on the grip of the drive wheels. It will therefore be seen that the present improvements are more especially directed to a novel draft means provided between the portion of the chassis which carries power plant assembly and the trailer vehicle or implement, thereby enabling a tractor of light weight to draw heavy load without risk of overturning, and at the same time facilitating the attachment and release of the trailer vehicle or implement in a simple and practical manner.

Four embodiments of the improved draft connections are shown in the accompanying drawings in which—

Fig. 1 shows a side view of a tractor of light weight, drawing a two-axle, four-wheel cart.

Fig. 2 shows the same tractor drawing a single-axle two-wheel cart, the wheels of which are intentionally placed far to the rear.

Figs. 3 and 4 show two other simplified forms of the coupling bar arrangement after being coupled to the tongue of a single axle vehicle.

The figures are shown schematically and in each of them the left-hand rear driving wheel has been omitted in order to increase the clarity of the drawing.

In each form of the invention the tractor chassis consists of two hingedly or pivotally connected parts designated generally as A and B; the main part or frame A being conveniently considered fixed relative to the normal plane of travel of the tractor while the auxiliary hinged part B, which carries the power plant assembly, is angularly movable relative thereto when the tractor is in draft relation to a trailer vehicle or implement, or, according to one form of the invention may be placed in predetermined angular relation by means interconnecting the rear of the power plant assembly and the front section of the coupling.

In Figures 1 and 2, referring to the main part A, I represents the chassis frame constituting the fixed or stationary part of the tractor with its front wheels 2, its hinged bearing around the axle of the driving wheels 3 and a bridge frame 4 connecting the two longitudinal beams of the frame of the chassis and carrying the steering wheel 5 as well as the seat 6 of the driver. The hinged part B includes the motor represented schematically by 7 with its fuel tank 7', and 8 designates the gear shaft box containing all instrumentalities necessary for transmitting the torque of the motor to the rear driving wheels (clutch, gears for different speeds, differential, etc.). The right hand rear traction or driving wheel is represented by 9. The motor 7 with its fuel tank 7' and gear box 8 forms the hinged part of the tractor and is articulated around the hinge bearing 3 to the fixed part of the tractor.

Figures 1 and 2 show the hinged power plant assembly B in its lifted draft position, the angle $a$, in Figure 1, indicating the distance, which the hinged part has moved from the approximately horizontal position in which the motor 7 bears against the chassis frame 1 by means of the stop piece 8' fixed on the gear box 8. This angle approximately represents the normal operating position of the hinged part B of the chassis with respect to the frame 1 of the main part A. However, it will of course be understood that the hinged part B or the frame 1 can still move, relative to each other, for a greater distance than the angle $a$, or until the top of the gear box 8 engages the cross piece 4a of the bridge frame 4. Thus, the tractor can move on uneven terrain notwithstanding the vertical rigidity of the entire coupling between the draft coupling C and the shaft of the trailer vehicle or implement. In the figures mentioned, the coupling C includes the front section 10 and the rear section 10a. The front section is fastened solidly to the rear end 22 of the hinged part B of the tractor at the flange 11 on an angle, while the yoke-like rear section 10a is connected to the shaft of the trailer vehicle or implement. The sections 10 and 10a of the said coupling C, in both forms of the invention, are articulated on a vertical pivot pin 12 to permit relative lateral turning movement between the tractor and the trailer. The said coupling C, in Figures 1 and 2 is further equipped with a shock absorbing compression spring 13 and although it comprises two sections articulated at 12, such articulation does not impair the rigidity of the entire draft coupling against the vertical movement. As a matter of example this spring may be placed ahead of the point of articulation 12 as shown in Fig. 2, or as shown in Fig. 1 behind this point. It is evident that the two parts or sections, 10 and 10a, of the coupling bar may pivot around its longitudinal axis with respect to each other, at the point where the spring is located, in order to permit the axles of the drawn vehicle to assume freely a slanting position with respect to the rear axle of the tractor. The coupling bar ends in a notched or bifurcated portion 14 including the horizontally disposed vertically spaced jaws 14b permitting it to be coupled rigidly to the tongue 15 of the cart 17 by bolts 14a (Fig. 1), or of the single axle vehicle 18 (Fig. 2).

Thus, the rear coupling section 10a in Figures 1 and 2 is connected with the tongue, draft bar, or the like, of a trailer by means rigid against vertical movement. The tongue of the trailer in effect constitutes a third or rear section of the coupling, the other two sections, namely, the front section 10 and the section 10a, in this manner of considering the invention being regarded as the middle section. The bolts 14b or their equivalent prevent either vertical or horizontal pivoting movement between the tongue 15 of the trailer and the section 10a. As per Figure 1, the tongue of the cart is articulated at 16 in the vertical plane near the front axle. This pivot prevents the three consecutive axles, namely, the rear axle of the tractor and the two axles of the cart from having to stay continuously on the same plane, but on the contrary enables same to move freely on uneven or broken ground. In Fig. 2, the tongue is not articulated because the cart is of the single-axle type. The tongue is rigidly connected to the cart and is very short in order that the load of the latter may be placed as closely as possible towards the rear axle of the tractor. An auxiliary wheel 19 which may be raised or lowered by means of the screw wheel 20, as shown in Fig. 2, permits the trailer to be loaded when it is detached from the tractor or permits it to be moved for a short distance. This is the preferred arrangement for drawn vehicles of any type with only one axle. The only axle of the drawn vehicle, as shown in Fig. 2, is shifted as much as possible towards the rear in order that the center of gravity of the carried load may be located as close as possible to the rear axle of the tractor.

The form shown in Fig. 3 of the drawings is used, preferably, when the tractor is used exclusively for drawing vehicles of the single axle type, very heavily loaded ahead of the said axle. In this form the coupling-bar section 10 coupled to the rear of the hinged part B of the tractor is pivoted around an axis such as the pin 38 located at a certain distance behind the axle of the rear driving-wheels.

The coupling-bar is connected to the tongue of the drawn vehicle while the weight of the load is supported by the auxiliary wheel 19 lowered to the ground. After coupling of the section 10 to part B has been accomplished, the auxiliary wheel is drawn to the lifted position by means of screw-handwheel 20. At this instant the weight of the drawn vehicle, due to its asymmetric distribution with respect to the single axle of the cart, bears upon the coupling-bar section 10 and the pin 38 and causes the hinged part B of the tractor to tilt, until the stop 39 on the rear extension 39a of the rear end 22 of the said hinged part comes to bear against a corresponding stop piece of the coupling-bar 10, there to become locked automatically with the same or to become locked with it by means of a pin 40 inserted by hand through an upstanding lug 40a as indicated in Fig. 3.

If the asymmetric weight of the drawn vehicle is not sufficient for tilting the hinged part B of the tractor, it will suffice to drive the tractor ahead in order to obtain at once the desired tilting angle because of the overturning-torque, supporting the tendency in case of necessity by applying the brakes to the rear-wheels. In this case it would be useful to replace the pin 40 by an automatic lock, as shown in the form illustrated in Fig. 4, in order that the locking operation between the bar 10 and the stop-piece 39 be accomplished without manual help while the driver is seated on the tractor. Fig. 4 shows schematically as an example, such an automatic lock 41 with an expansion spring 42 and an unlocking lever 43. This lock 41 engages in a notched keeper 41a.

In connection with the Figs. 3 and 4, there can be stated that the coupling-bar is rigidly connected to the hinged part B of the tractor, even if locking had not been accomplished by means of the pin 40 or by means of the lock 41, as long as the asymmetric weight of the drawn vehicle and the overturning-torque are sufficiently large to permit the stop 39 on the extension 39a of the rear of the power plant to bear firmly and constantly against the coupling-bar 10.

Suitable means may be provided for tilting the hinged part B of the tractor to facilitate coupling the trailer thereto. However, this suitable means is the subject matter of my co-pending application, Serial No. 39,388, filed July 19, 1948, and accordingly, it is not necessary to illustrate or describe the same in the present application.

There is thus provided novel means for facilitating transportation of relatively heavy loads with relatively light weight tractors by the provision of a load distributing draft coupling arrangement between tractor and trailer.

While only four embodiments of the present invention are illustrated, it is to be expressly understood that various constructions and arrangements of the parts may now be resorted to by others skilled in the art without departing from the scope of the present invention. To determine the scope of the present invention, reference should be had to the appended claims.

I claim:

1. In a tractor having a chassis consisting of a wheeled frame including rear drive wheels and a power plant assembly pivotally mounted on an axis coinciding with the axis of said rear drive wheels, a draft coupling for a trailer device, said coupling comprising; a front section rigidly connected to the rear of the movable power plant assembly, a rear section for rigid connection in a vertical plane with the tongue of a trailer to thereby coact with said pivoted part of the tractor to increase the traction of the rear drive wheels of said wheeled frame by the application of force imparted from the distribution of the weight of said pivoted part around the said axis of the rear wheels and a substantial portion of the trailer weight and load, and means for articulating the inner ends of said sections, whereby, said trailer may turn on a vertical axis relative to the said movable power plant assembly.

2. In a tractor according to claim 1, wherein a compression spring is housed in the front section of the coupling connected to the power plant assembly, and the rear section of the coupling is provided with a plunger adapted to cooperate with said spring.

3. In a tractor having a chassis consisting of a wheeled frame including rear drive wheels and a power plant assembly pivotally mounted on an axis coinciding with the axis of said rear drive wheels, a draft coupling for a trailer device, said coupling comprising front and rear sections, a vertical pivot joining the inner ends of said sections, means for pivotally connecting the forward end of the front section to the rear of the power plant assembly, means for rigidly connecting in a vertical plane the rear section to a trailer device, and means for inter-connecting a rear extension on the movable power plant assembly with the front section for positively holding the power plant in a rearwardly inclined position when the rear section is connected to a trailer vehicle or implement.

4. In a tractor according to claim 3 wherein said means for inter-connecting the power plant assembly and the front section of the coupling includes, said extension on the rear of the power plant assembly having a part abutting the upper side of the front section of the coupling and is also provided with a portion having an eye, an upstanding lug on the front section also having an eye adapted to register with said first-mentioned eye, and a removable and replaceable pin adapted to pass through said eyes.

5. In a tractor according to claim 3 wherein the means for inter-connecting the rear of the power plant assembly and the front section of the coupling includes, said extension at the rear of the power plant assembly having a part abutting with the upper face of the front section and the end of said extension is formed with a keeper notch, and a spring latch on the front section for engaging said keeper.

6. In a tractor of the type having a chassis consisting of a wheeled frame including rear drive wheels and a power plant assembly movably mounted to rock on an axis coinciding with the axis of said rear drive wheels, a draft coupling for connecting a wheeled trailer device to the tractor, said coupling comprising; a front section and a rear section, a vertical pivot joining the inner ends of said sections, means for connecting the forward end of the front section to the movable power plant assembly in fixed relation thereto, and means rigid against vertical movement for connecting the rear section of the coupling to the trailer device, whereby, a variable distribution of both the load of the power plant assembly and the trailer device may be imparted to the rear drive wheels by rocking movement of said power plant assembly.

LEON DUFOUR.

REFERENCES CITED

The following references are of record in the file of this patent:

UNITED STATES PATENTS

| Number | Name | Date |
| --- | --- | --- |
| 1,270,480 | McCloskey | June 25, 1918 |
| 1,305,472 | Lauby | June 3, 1919 |
| 1,431,311 | Krotz | Oct. 10, 1922 |
| 1,565,832 | Waterman | Dec. 15, 1925 |
| 2,035,150 | Dufour | Mar. 26, 1936 |
| 2,349,361 | MacDonald | May 23, 1944 |